United States Patent
Kuehl et al.

(10) Patent No.: US 12,460,022 B2
(45) Date of Patent: Nov. 4, 2025

(54) SUSPENSION PROCESS FOR PREPARING ETHYLENE POLYMERS COMPRISING WORKUP OF THE SUSPENSION MEDIUM

(71) Applicant: Basell Polyolefine GmbH, Wesseling (DE)

(72) Inventors: Reinhard Kuehl, Bornheim (DE); Volker Dolle, Bensheim (DE); Peter Rohrbach, Hofheim/Ts. (DE); Elke Damm, Bad Vilbel (DE)

(73) Assignee: Basell Polyolefine GmbH, Wesseling (DE)

( * ) Notice: Subject to any disclaimer, the term of this patent is extended or adjusted under 35 U.S.C. 154(b) by 577 days.

(21) Appl. No.: 17/912,618

(22) PCT Filed: Mar. 19, 2021

(86) PCT No.: PCT/EP2021/057088
§ 371 (c)(1),
(2) Date: Sep. 19, 2022

(87) PCT Pub. No.: WO2021/191076
PCT Pub. Date: Sep. 30, 2021

(65) Prior Publication Data
US 2023/0133399 A1    May 4, 2023

(30) Foreign Application Priority Data
Mar. 24, 2020 (EP) .................................... 20165161

(51) Int. Cl.
C08F 210/16 (2006.01)
C08F 6/00 (2006.01)
(Continued)

(52) U.S. Cl.
CPC ................ *C08F 6/003* (2013.01); *C08F 6/24* (2013.01); *C08F 10/02* (2013.01); *C08F 210/16* (2013.01);
(Continued)

(58) Field of Classification Search
None
See application file for complete search history.

(56) References Cited

U.S. PATENT DOCUMENTS

| 4,105,609 A | 8/1978 | Machon |
| 6,204,345 B1 | 3/2001 | Berthold et al. |

(Continued)

FOREIGN PATENT DOCUMENTS

| CN | 1176255 A | 3/1998 |
| CN | 101379092 A | 3/2009 |

(Continued)

OTHER PUBLICATIONS

The International Search Report and The Written Opinion for PCT/EP2021/057088 mailed Jul. 7, 2021.
(Continued)

*Primary Examiner* — Richard A. Huhn

(57) ABSTRACT

A process for preparing an ethylene polymer in a suspension polymerization including the steps of separating the formed suspension of ethylene polymer particles in a solid-liquid separator into ethylene polymer particles and mother liquor, transferring a first part of the mother liquor into a work-up section including an evaporation unit for producing a wax-depleted portion of the mother liquor, wherein a protic agent is added to the part of the mother liquor which is transferred into the work-up section, and recycling a first part of the wax-depleted portion of the mother liquor to the polymerization reactor or the series of polymerization reactors.

20 Claims, 2 Drawing Sheets

(51) Int. Cl.
*C08F 6/24* (2006.01)
*C08F 10/02* (2006.01)

(52) U.S. Cl.
CPC ........ *C08J 2323/08* (2013.01); *C08J 2323/16* (2013.01)

(56) References Cited

U.S. PATENT DOCUMENTS 11,525,017 B2   12/2022   Rohrbach et al.
11,834,531 B2 * 12/2023   Damm ................... C08F 2/001

FOREIGN PATENT DOCUMENTS

| CN | 105377902 | A  | 3/2016  |
| EP | 0905152   | A1 | 3/1999  |
| RU | 2679899   | C2 | 2/2019  |
| WO | 9426816   | A1 | 11/1994 |
| WO | 2010136202 | A1 | 12/2010 |
| WO | 2011087728 | A2 | 7/2011  |
| WO | 2012028591 | A1 | 3/2012  |
| WO | 2018046169 | A1 | 3/2018  |
| WO | 2018234350 | A1 | 12/2018 |
| WO | 2019099138 | A1 | 5/2019  |
| WO | 2019243384 | A1 | 12/2019 |
| WO | 2020239885 | A1 | 12/2020 |
| WO | 2020239887 | A1 | 12/2020 |

OTHER PUBLICATIONS

Frank P. Alt et al., Bimodal Polyethylene—Interplay of Catalyst and Process, Macromol. Symp. 2001, 163, 135-143.

* cited by examiner

SUSPENSION PROCESS FOR PREPARING ETHYLENE POLYMERS COMPRISING WORKUP OF THE SUSPENSION MEDIUM

This application is the U.S. National Phase of PCT International Application PCT/EP2021/057088, filed Mar. 19, 2021, claiming benefit of priority to European Patent Application No. 20165161.9, filed Mar. 24, 2020, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a process for preparing an ethylene polymer in a suspension polymerization in a polymerization reactor or a series of polymerization reactors.

BACKGROUND OF THE INVENTION

In some instances, suspension processes are used for preparing ethylene polymers. In some instances, such processes are carried out in a series of reactors, thereby allowing different reaction conditions in the polymerization reactors and producing different polymer compositions in the individual polymerization reactors. In some instances, suspension processes for preparing ethylene polymers employ a hydrocarbon or a hydrocarbon mixture as diluent. The suspension medium, which forms the liquid or supercritical phase of the suspension, is made from or containing the diluent and components like dissolved ethylene, comonomers, aluminum alkyls, and hydrogen and dissolved reaction products like oligomers and waxes.

In some instances, not consumed components of the reaction mixture like the diluent or non-polymerized monomers or comonomers are recycled to the polymerization process. The separation of the produced polyethylene particles from the formed suspension results in ethylene polymer particles and separated suspension medium, which may be referred to as "mother liquor." In some instances, the polymer particles are wet and subsequently dried in a powder dryer. In some instances, the dryer uses a hot gas stream such as a hot nitrogen stream. In some instances, the hydrocarbons contained in the hot gas stream are separated from the hot gas stream and transferred into a liquid hydrocarbon recover stream, which is returned to the polymerization.

In some instances, the mother liquor is recycled directly to the polymerization process. However, to remove side products of the polymerization reaction which are soluble in the suspension medium from the polymerization process, a part of the mother liquor is worked up. In some instances, another reason for working up the mother liquor is that the suspension obtained after the final reactor of a series of polymerization reactors contains components which should not be introduced into one of the previous polymerization reactors for producing polyethylenes with specific property combinations.

The mother liquor to be worked up is a multi-component mixture. Accordingly, various separation steps such as evaporation or distillation steps remove unwanted components and split those constituents which are intended to be recycled to the polymerization process. Finally, the diluent is purified in adsorbers and fed back into the process.

In some instances and for carrying out the evaporation and/or distillation steps in the work-up of the mother liquor, the mother liquor is heated. In some instances, the heating occurs in heat exchangers. Heating the mother liquor in a heat exchanger fouls the heat exchanger. This means, deposits are formed on the surface of the heat exchangers and their heat exchange efficiency decreases. Consequently, frequent cleaning of the heat exchangers occurs and results in downtime of the polymerization system.

SUMMARY OF THE INVENTION

In a general embodiment, the present disclosure provides a process for preparing an ethylene polymer in a suspension polymerization in a polymerization reactor or a series of polymerization reactors including the steps of polymerizing ethylene or copolymerizing ethylene and one or more $C_3$-$C_{12}$-1-alkenes at temperatures of from 40 to 150° C. and pressures of from 0.1 to 20 MPa in the presence of a polymerization catalyst and forming a suspension of ethylene polymer particles in a suspension medium made from or containing a hydrocarbon diluent, transferring the suspension of ethylene polymer particles into a solid-liquid separator, wherein the suspension is separated into ethylene polymer particles and mother liquor, transferring a first part of the mother liquor into a work-up section including an evaporation unit for producing a wax-depleted portion of the mother liquor, wherein a protic agent is added to the part of the mother liquor which is transferred into the work-up section, and recycling a first part of the wax-depleted portion of the mother liquor to the polymerization reactor or the series of polymerization reactors.

In some embodiments, the protic agent is water, an alcohol, an acid, or a mixture thereof.

In some embodiments, the protic agent is water. In some embodiments, the water is added in liquid form, as steam or an aqueous solution of an organic or inorganic compound.

In some embodiments, the mixture of mother liquor and added protic agent to be transferred into the work-up section passes a mixing device before entering the work-up section.

In some embodiments, the mixing device is an inline mixer, a jet mixer, mixing nozzles, a hydrocyclone, a vessel equipped with a mixing element, a rotor/stator mixer, a homogenizer, or an emulsifier.

In some embodiments, a heat exchanger, operating as pre-heater, is installed upstream of the evaporation unit. In some embodiments, the mixture of mother liquor and added protic agent transferred into the work-up section is passed through the heat exchanger before entering the evaporation unit.

In some embodiments, the evaporation unit is a circulating evaporation unit including a heat exchanger and a separation vessel. In some embodiments, the circulating evaporation unit is operated by feeding the liquid phase to be evaporated into the heat exchanger, vaporizing partly the liquid phase in the heat exchanger, and returning the resulting liquid and vapor mixture to the separation vessel.

In some embodiments, the wax-depleted portion of the mother liquor produced in the evaporation unit is further subjected to a distillation process before being recycled to the polymerization reactor or the series of polymerization reactors.

In some embodiments, a wax containing part of the mother liquor depleted of lower boiling point components is withdrawn from the evaporation unit and transferred to a wax removal unit which is operated by direct steam distillation.

In some embodiments, wax removal unit produces a gaseous hydrocarbon/steam mixture which is condensed and then separated, within a liquid-liquid separator, into an aqueous phase and a hydrocarbon phase. In some embodiments, the hydrocarbon phase is recycled to the evaporation unit.

In some embodiments, the prepared ethylene polymer is a multimodal ethylene copolymer.

In some embodiments, the preparation of the ethylene polymer is carried out in a series of polymerization reactors. In some embodiments, an ethylene homopolymer is prepared in one of the polymerization reactors. In some embodiments, the prepared ethylene polymer is a multimodal ethylene copolymer, the preparation of the ethylene polymer is carried out in a series of polymerization reactors, and an ethylene homopolymer is prepared in one of the polymerization reactors.

In some embodiments, the ethylene homopolymer is prepared in the first polymerization reactor of the series of polymerization reactors. In some embodiments, a copolymer of ethylene is prepared in a subsequent polymerization reactor.

DETAILED DESCRIPTION OF THE INVENTION

Figure 1:
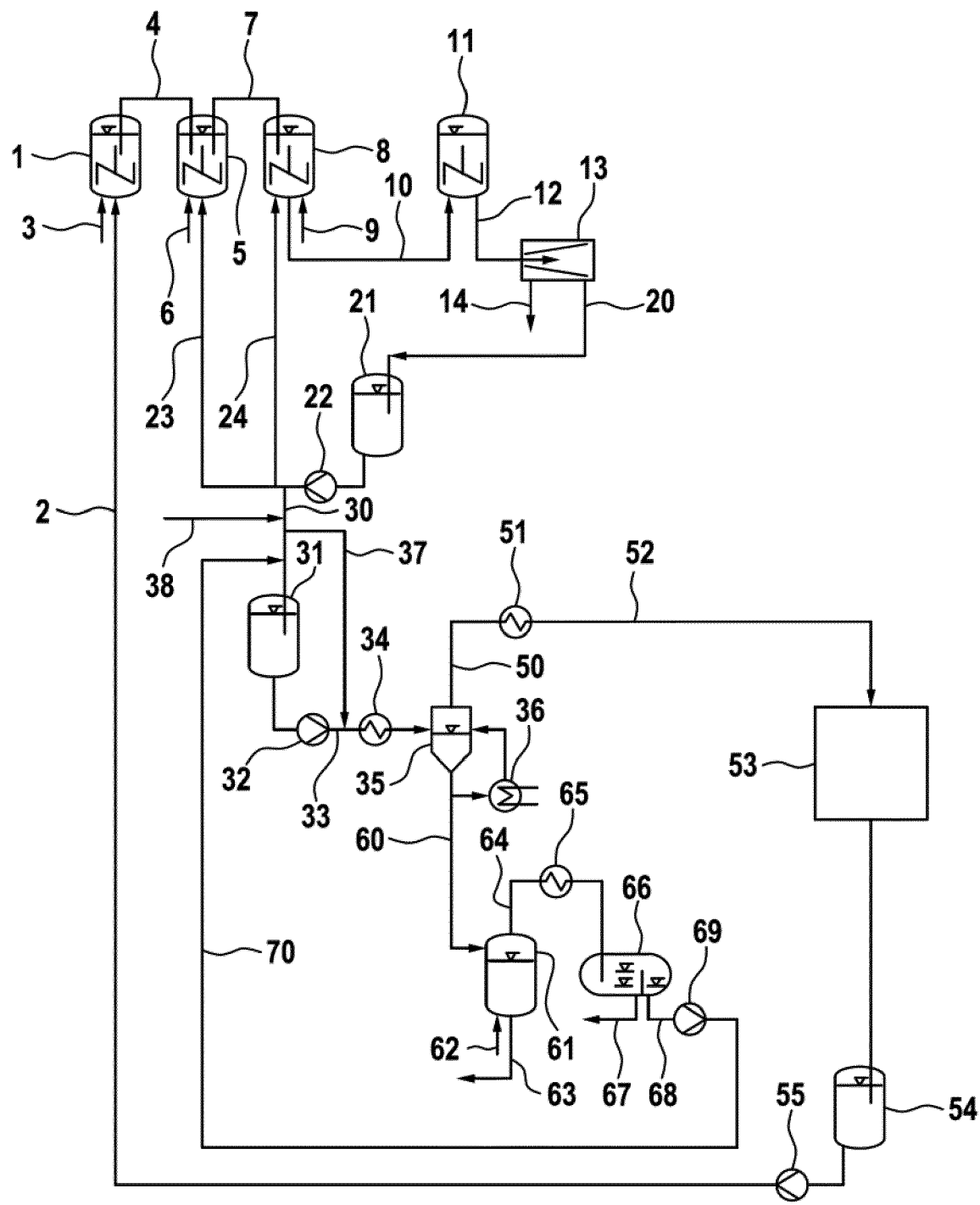
FIG. 1 is a schematic of a process for preparing ethylene polymers in suspension.

In a general embodiment, the present disclosure provides a process for preparing an ethylene polymer in a suspension polymerization in a polymerization reactor or in a series of polymerization reactors. In some embodiments, the ethylene polymers are prepared by polymerizing ethylene or copolymerizing ethylene and one or more $C_3$-$C_{12}$-1-alkenes in the presence of a polymerization catalyst. In some embodiments, the $C_3$-$C_{12}$-1-alkenes are linear or branched, alternatively linear $C_3$-$C_{10}$-1-alkenes or branched $C_2$-$C_{10}$-1-alkenes. In some embodiments, the linear $C_3$-$C_{10}$-1-alkenes are selected from the group consisting of propylene, 1-butene, 1-pentene, 1-hexene, 1-heptene, 1-octene, and 1-decene. In some embodiments, the branched $C_2$-$C_{10}$-1-alkenes are 4-methyl-1-pentene. In some embodiments, the ethylene is polymerized with mixtures of two or more $C_3$-$C_{12}$-1-alkenes. In some embodiments, comonomers are $C_3$-$C_8$-1-alkenes. In some embodiment, the $C_3$-$C_8$-1-alkenes are selected from the group consisting of 1-butene, 1-pentene, 1-hexene, 1-heptene and 1-octene. In some ethylene copolymers, the amount of units derived from incorporated comonomers is from 0.01 wt. % to 25 wt. %, alternatively from 0.05 wt. % to 15 wt. %, alternatively from 0.1 wt. % to 12 wt. %. In some embodiments, ethylene is copolymerized with from 0.1 wt. % to 12 wt. % of 1-hexene and/or 1-butene, alternatively from 0.1 wt. % to 12 wt. % of 1-butene.

In some embodiments, the polymerization is carried out using olefin polymerization catalysts. In some embodiments, the polymerization is carried out using Phillips catalysts based on chromium oxide, titanium-based Ziegler- or Ziegler-Natta-catalysts, single-site catalysts, or mixtures of such catalysts. As used herein, the term "single-site catalysts" refers to catalysts based on chemically uniform transition metal coordination compounds. In some embodiments, mixtures of two or more of these catalysts are used for the polymerization of olefins. As used herein, mixed catalysts may be alternatively designated "hybrid catalysts."

In some embodiments, the catalysts are of the Ziegler type. In some embodiments, the Ziegler-type catalysts are made from or containing a compound of titanium or vanadium, a compound of magnesium and optionally an electron donor compound and/or a particulate inorganic oxide as a support material.

In some embodiments, catalysts of the Ziegler type are polymerized in the presence of a cocatalyst. In some embodiments, the cocatalysts are organometallic compounds of metals of Groups 1, 2, 12, 13 or 14 of the Periodic Table of Elements, alternatively organometallic compounds of metals of Group 13, alternatively organoaluminum compounds. In some embodiments, the cocatalysts are selected from the group consisting of organometallic alkyls, organometallic alkoxides, and organometallic halides.

In some embodiments, the organometallic compounds are selected from the group consisting of lithium alkyls, magnesium or zinc alkyls, magnesium alkyl halides, aluminum alkyls, silicon alkyls, silicon alkoxides and silicon alkyl halides. In some embodiments, the organometallic compounds are selected from the group consisting of aluminum alkyls and magnesium alkyls. In some embodiments, the organometallic compounds are aluminum alkyls, alternatively trialkylaluminum compounds or compounds of this type wherein an alkyl group is replaced by a halogen atom. In some embodiments, the halogen is chlorine or bromine. In some embodiments, the aluminum alkyls are selected from the group consisting of trimethylaluminum, triethylaluminum, tri-isobutylaluminum, tri-n-hexylaluminum. or diethylaluminum chloride and mixtures thereof.

In some embodiments, the polymerization process is carried out in suspension. As used herein, the term "suspension polymerization" may alternatively be designated "slurry polymerizations." The suspension polymerizations take place in a medium, which is in liquid or in supercritical state under the conditions in the respective polymerization reactor and wherein the produced ethylene polymer is insoluble and forms solid particles. As used herein, the term "suspension medium" is alternatively used to denote the medium. In some embodiments, the solids content of the suspension is in the range of from 10 to 80 wt. %, alternatively from 20 to 40 wt. %.

In some embodiments, the suspension medium, which forms the liquid or supercritical phase of the suspension, is made from or containing a diluent and further components. In some embodiments, the further components are selected from the group consisting of dissolved monomers or comonomers, dissolved cocatalysts or scavengers, dissolved reaction auxiliaries, and dissolved reaction products of the polymerization reaction. In some embodiments, the dissolved cocatalysts or scavengers are aluminum alkyls. In some embodiments, the dissolved reaction auxiliaries are hydrogen. In some embodiments, the dissolved reaction products of the polymerization reaction are oligomers or waxes. In some embodiments, the diluents are inert, that is, do not decompose under reaction conditions. In some embodiments, the diluents are hydrocarbons having from 3 to 12 carbon atoms. In some embodiments, the diluents are saturated hydrocarbons. In some embodiments, the saturated hydrocarbons are selected from the group consisting of isobutane, butane, propane, isopentane, pentane, hexane, octane, and a mixture of these. In some embodiments, the diluent is a hydrocarbon mixture. In some embodiments, hydrocarbon mixtures have a boiling point range.

In some embodiments, the diluent has a boiling point different from the boiling points of the monomers and comonomers, thereby permitting recovery of the starting materials from a mixture by distillation. In some embodiments, the diluents are hydrocarbons having a boiling point above 40° C., alternatively above 60° C., or mixtures made from or containing hydrocarbons having the specified boiling point. In some embodiments, the polymerization takes place in a liquid suspension medium made from or containing more than 50 wt. % of saturated hydrocarbons having a boiling point of above 60° C. at 0.1 MPa, alternatively more than 80 wt. % of saturated hydrocarbons having a boiling point of above 60° C. at 0.1 MPa.

In some embodiments, the process is carried out using a suspension polymerization processes at temperatures in the range from 40 to 150° C., alternatively from 50 to 130° C., alternatively from 60 to 90° C. In some embodiments, the process is carried out using a suspension polymerization processes under pressures of from 0.1 to 20 MPa, alternatively from 0.15 to 5 MPa, alternatively from 0.2 MPa to 2 MPa.

In some embodiments, the polymerization is carried out in a series of at least two polymerization reactors which are connected in series. In some embodiments, these reactors are loop reactors or stirred tank reactors. There is no limit to the number of reactors of such a series. In some embodiments, the series consist of two, three or four reactors, alternatively two or three reactors. In some embodiments, a series of polymerization reactors is used, and the polymerization conditions in the polymerization reactors differ. In some embodiments, the polymerization conditions differ by the nature of comonomers, the amount of comonomers or concentrations of polymerization auxiliaries such as hydrogen. In some embodiments, the polymerization is a suspension polymerization in stirred tank reactors.

In some embodiments, the ethylene polymers are obtained as powder. As used herein, the term "powder" refers to in the form of small particles. In some embodiments, the particles have a regular morphology and size, which depend on the catalyst morphology, the catalyst size, and polymerization conditions. In some embodiments and depending on the catalyst used, the particles of the polyolefin powder have a mean diameter of from a few hundred to a few thousand micrometers. In some embodiments and with chromium catalysts, the mean particle diameter is from about 300 to about 1600 µm. In some embodiments and with Ziegler type catalysts, the mean particle diameter is from about 50 to about 3000 µm. In some embodiments, the polyolefin powders have a mean particle diameter of from 100 to 250 µm. In some embodiments, the particle size distribution is determined by sieving, alternatively by vibrating sieve analysis or sieve analysis under an air jet.

In some embodiments, the density of ethylene polymers obtained by the process is from 0.90 g/cm$^3$ to 0.97 g/cm$^3$, alternatively from 0.920 to 0.968 g/cm$^3$, alternatively from 0.945 to 0.965 g/cm$^3$. As used herein, the term "density" refers to the density determined according to DIN EN ISO 1183-1:2004, Method A (Immersion) with compression molded plaques of 2 mm thickness which were pressed at 180° C., 20 MPa for 8 minutes with subsequent crystallization in boiling water for 30 minutes.

In some embodiments, the polyethylenes have a MFR$_{21.6}$ at a temperature of 190° C. under a load of 21.6 kg, determined according to DIN EN ISO 1133:2005, condition G, from 0.5 to 300 g/10 min, alternatively from 1 to 100 g/10 min, alternatively from 1.2 to 100 g/10 min, alternatively from 1.5 to 50 g/10 min.

In some embodiments, the ethylene polymers are monomodal, bimodal or multimodal ethylene polymers. In some embodiments, the ethylene polymers are bimodal or multimodal ethylene polymers. As used herein, the term "multimodal" refers to the modality of the obtained ethylene copolymer and indicates that the ethylene copolymer is made from or containing at least two fractions of polymer which are obtained under different reaction conditions, independently whether this modality is recognized as separated maxima in a gel permeation chromatography (GPC) curve or not. In some embodiments, the different polymerization conditions are achieved by using different hydrogen or different comonomer concentrations in different polymerization reactors. In some embodiments, the polymers are obtained from polymerizing olefins in a series of two or more polymerization reactors under different reaction conditions. In some embodiments, the bimodal or multimodal polyolefins are obtained by employing mixed catalysts. In some embodiments and in addition to the molecular weight distribution, the polyolefin has a comonomer distribution. In some embodiments, the average comonomer content of polymer chains with a higher molecular weight is higher than the average comonomer content of polymer chains with a lower molecular weight. As used herein, in the term "multimodal" also includes "bimodal".

In some embodiments, the polymerization is carried out in a series of polymerization reactors. In some embodiments, an ethylene homopolymer is prepared in the first polymerization reactor and an ethylene copolymer is prepared in a subsequent polymerization reactor. In some embodiments, the ethylene homopolymer is a low molecular weight ethylene homopolymer. In some embodiments, the ethylene copolymer is a high molecular weight ethylene copolymer. In some embodiments and to prepare an ethylene homopolymer in the first polymerization reactor, no comonomer is fed to the first polymerization reactor, neither directly nor as component of a feed stream or a recycle stream which is introduced into the first polymerization reactor of the series of polymerization reactors. In some embodiments, the obtained multimodal ethylene copolymers are made from or containing from 35 to 65% by weight of ethylene homopolymer prepared in the first polymerization reactor and from 35 to 65% by weight of ethylene copolymer prepared in the subsequent polymerization reactor. In some embodiments, the series of polymerization reactors includes one are more prepolymerization reactors and the prepolymerization is carried out without adding comonomers.

In some embodiments, the ethylene polymer is prepared in a series of three polymerization reactors, that is, in a first polymerization reactor and two subsequent polymerization reactors, wherein the ethylene polymer prepared in the first polymerization reactor is an ethylene homopolymer, the polyethylene prepared in one of the subsequent polymerization reactors is a first ethylene copolymer, and the polyethylene prepared in the other subsequent polymerization reactor is a second ethylene copolymer of a higher molecular weight. In some embodiments, the ethylene homopolymer is a low molecular weight ethylene homopolymer. In some embodiments, the first ethylene copolymer is a high molecular weight copolymer. In some embodiments, the second ethylene copolymer of a higher molecular weight is an ultrahigh molecular weight copolymer. In some embodiments, the obtained multimodal ethylene copolymers is made from or containing from 30 to 60% by weight, alternatively from 45 to 55% by weight, of ethylene homopolymer prepared in the first polymerization reactor, from 30 to 65% by weight, alternatively from 20 to 40% by weight, of a first ethylene copolymer prepared in one subsequent polymerization reactor, and from 1 to 30% by weight, alternatively from 15 to 30% by weight, of a higher molecular weight second ethylene copolymer prepared in the other subsequent polymerization reactor.

In the process, the suspension of ethylene polymer formed in the polymerization reactor or the series of polymerization reactors is transferred into a solid-liquid separator, wherein the ethylene polymer particles are separated from the suspension medium. In some embodiments, this separation into ethylene polymer particles and mother liquor is carried out in centrifuges, decanters, filters, or combinations thereof. In some embodiments, the solid-liquid separator is a centrifuge. In some embodiments, the suspension withdrawn from the polymerization reactor or the series of polymerization reactors is first transferred into a separator feed vessel and then conveyed from the separator feed vessel to the solid-liquid separator.

As used herein, the term "mother liquor" refers to the separated suspension medium obtained from the suspension in the solid-liquid separator. In some embodiments, the mother liquor is made from or containing more than 70 wt. % of diluent. In some embodiments, the components of the mother liquor also include ethylene, comonomers, aluminum alkyls, hydrogen and dissolved reaction products like oligomers and waxes. As used herein, the term "oligomer" refers to hydrocarbons which have a higher molecular weight than the diluent and the comonomer or the comonomers and which are liquid at standard pressure and room temperature. As used herein, the term "wax" refers to hydrocarbons which are dissolved in the mother liquor at reactor temperature or below and which are, after evaporation of the diluent and the oligomers, solid at standard pressure and room temperature. In some embodiments, the mother liquor is made from or containing from 75 to 99.5 wt. %, alternatively from 80 to 99 wt. %, of diluent; from 0.5 to 20 wt. %, alternatively from 1 to 10 wt. %, of oligomers; from 0 to 5 wt. %, alternatively from 0.3 to 3 wt. %, of comonomer or comonomers; from 0 to 5 wt. %, alternatively from 0.2 to 3 wt. %, of waxes, from 0 to 1 wt. %, alternatively from 0.001 to 0.1 wt. %, of ethylene, from 0 to 0.1 wt. % hydrogen, and from 0.1 to 2.5 mmol/l aluminum alkyls or reaction products of aluminum alkyls.

In some embodiments, the ethylene polymer particles obtained in the solid-liquid separator contain suspension medium, that is, the ethylene polymer particles are "wet". In some embodiments, the wet ethylene polymer particles contain from 10 wt. % to 40 wt. %, alternatively from 15 wt. % to 35 wt. %, of suspension medium, that is, of mother liquor. In some embodiments, the separated ethylene polymer particles are dried by contacting the particles with a gas stream, thereby forming a gas stream carrying a hydrocarbon load. In some embodiments, the drying occurs in equipment wherein a powder is contacted, alternatively contacted countercurrently, with a gas stream for taking up suspension medium attached to or included in the ethylene polymer particles. In some embodiments, powder dryers are operated with hot nitrogen which is circulated in a closed loop. In some embodiments, drying is carried out in a two-stage dryer, wherein residual suspension medium is stripped from the ethylene polymer particles in two subsequent stages. In some embodiments, dried ethylene polymer particles are pneumatically conveyed to an extrusion section, wherein additives are added, and the mixture is molten, homogenized, and pelletized. In some embodiments, the dried ethylene polymer particles coming from the powder dryer first pass a degassing unit and/or a powder treatment unit before being conveyed to the extrusion section.

In some embodiments, the hydrocarbon load taken up by the gas stream for drying the wet ethylene polymer particles is subsequently separated from the gas stream, thereby forming a liquid hydrocarbon recover stream. In some embodiments, the separation occurs by condensation. In some embodiments, the hydrocarbon load is separated from the gas stream in a scrubber into which a cooled liquid phase is introduced. In some embodiments, the liquid phase, which has taken up the hydrocarbon load from the gas stream coming from the dryer, forms the liquid hydrocarbon recover stream. In some embodiments, the liquid hydrocarbon recover stream is withdrawn from the bottom of the scrubber and a part of the liquid hydrocarbon recover stream is returned to the scrubber as cooled liquid phase after having passed a cooler. In some embodiments, the gas stream coming from the dryer passes a particle removing equipment before the hydrocarbon load is separated from the gas stream. In some embodiments, the particle removing equipment is a filter or a cyclone.

In some embodiments, a major portion of the mother liquor is recycled to the polymerization reactor or the series of polymerization reactors. In some embodiments, the polymerization is carried out in a series of polymerization reactors. In some embodiments, the polymerization reactors of the series of polymerization reactors are provided with recycled parts of the mother liquor. In some embodiments, from 90 to 99.99 wt. %, alternatively from 95 to 99.5 wt. %, alternatively from 97 to 99 wt. %, of the mother liquor are recycled to the polymerization reactor or the series of polymerization reactors. In some embodiments, the parts of the mother liquor which are not recycled include, continuous flushings of pumps, off-gas vented to purge gaseous impurities of the feed streams or gaseous by-products of the polymerization process or dissolved reaction products. In some embodiments, the dissolved reaction products are waxes intentionally removed from the mother liquor.

In some embodiments, the mother liquor is first fed to a mother liquor collecting vessel. In some embodiments and for recycling to the polymerization process, the mother liquor is withdrawn from the mother liquor collecting vessel.

In some embodiments, the mother liquor is recycled to the polymerization reactor or the series of polymerization reactors as such. In some embodiments, the mother liquor is recycled in worked-up form. In some embodiments, a first part of the mother liquor is worked up in a work-up section for producing worked-up components of the mother liquor. As used herein, the term "work-up" refers to a composition separated in one or more separated compositions or that one or more components of a composition are removed from the composition and a purified composition void of or depleted in the removed component(s) is obtained. In some embodiments, a work-up results in isolating individual components of the composition. In some embodiments, a work-up process includes removing components of the mother liquor, which have a boiling point lower than the boiling point of the diluent. In some embodiments, the removed components are selected from the group consisting of ethylene and 1-butene. In some embodiments, a work-up process includes removing components of the suspension medium, which have a boiling point higher than the boiling point of the diluent. In some embodiments, the removed components are selected from the group consisting of oligomers and/or waxes. In some embodiments, the amount of mother liquor, which passes the work-up section, is from 10 to 90 wt. %, alternatively from 20 to 80 wt. %, alternatively from 30 to 70 wt. %, of the mother liquor recycled to the series of polymerization reactors. In some embodiments of the work-up process, the mother liquor is separated in two or more components which are recycled to the polymerization in individual recycle circuits. In some embodiments and after the separation, each of the individual recycle circuits includes further purification steps. In some embodiments, components of the mother liquor are recycled to the series of polymerization reactors in individual recycle circuits and made from or containing the diluent, ethylene and comonomers. In some embodiments, the worked-up components of the mother liquor are transferred to any polymerization reactor used for carrying out the polymerization.

In some embodiments, the work-up section for working up the mother liquor includes an evaporation unit into which the part of the mother liquor to be worked up is transferred for producing a wax-depleted portion of the mother liquor. In some embodiments, the evaporation unit separates the mother liquor in lower boiling point components, which are withdrawn in gaseous form from the evaporation unit, and a wax containing, remaining part which is depleted in lower boiling point components. The evaporated part, which is withdrawn in gaseous form from the evaporation unit, represents the wax-depleted portion of the mother liquor. At least a part of this wax-depleted portion of the mother liquor is recycled to the polymerization reactor or the series of polymerization reactors.

In some embodiments, a protic agent is added to the part of the mother liquor which is transferred into the work-up section. In some embodiments, the protic agent is a chemical compound which can donate protons to metal alkyl compounds, thereby triggering the chemical decomposition of cocatalysts or of the active sites of the olefin polymerization catalysts. In some embodiments, the cocatalysts are aluminum alkyls. In some embodiments, the protic agent is water, an alcohol, an acid, or a mixture thereof. In some embodiments, water is added in liquid form, as steam or an aqueous solution of an organic or inorganic compound. In some embodiments, water is added in liquid form or as steam. In some embodiments, the alcohols are selected from the group consisting of monovalent and polyvalent alcohols. In some embodiments, the alcohols are selected from the group consisting of n-hexanol, n-heptanol, n-octanol, n-nonanol, n-decanol, n-undecanol, n-dodecanol, glycerin, glycols, and their mixtures. In some embodiments, the acids are selected from the group consisting of organic and inorganic acids. In some embodiments, the protic agent is water which is added as water or steam. In some embodiments, the protic agent is added in an amount which is in a range from a stochiometric amount up to ten times the stochiometric amount, of protic agent with respect to the content of cocatalyst and other components of the olefin polymerization catalyst system in the mother liquor to be worked-up. In some embodiments, the protic agent is added in an amount which is in a range from 1.5 times up to three times. of the stochiometric amount of protic agent with respect to the content of cocatalyst and other components of the olefin polymerization catalyst system in the mother liquor to be worked-up.

In some embodiments, the protic agent is added in a ratio of from 10 g to 10000 g protic agent per ton of mother liquor, alternatively from 20 g to 5000 g protic agent per ton of mother liquor, alternatively from 30 g to 3000 g protic agent per ton of mother liquor, alternatively from 50 g to 1000 g protic agent per ton of mother liquor. In some embodiments, the protic agent is water added in a ratio of 10 g to 2500 g water per ton of mother liquor, alternatively from 20 g to 1500 g water per ton of mother liquor, alternatively from 30 g to 500 g water per ton of mother liquor.

In some embodiments, the protic agent is added at any position between the evaporation unit and the point, where the part of the mother liquor to be worked-up is separated from the mother liquor which is recycled to the polymerization reactor or the series of polymerization reactors as such. In some embodiments, the protic agent is added at one or more positions to the mother liquor to be worked up. In some embodiments, the protic agent is added at one position. In some embodiments, the protic agent is added at one or more positions to the mother liquor to be worked up between the evaporation unit and the point, where the part of the mother liquor to be worked-up is separated from the mother liquor which is recycled to the polymerization reactor or the series of polymerization reactors.

In some embodiments, the mixture of mother liquor and added protic agent to be transferred into the work-up section passes a mixing device before entering the work-up section, thereby intensifying the mixing of mother liquor and protic agent. In some embodiments, the mixing device is an inline mixer, a jet mixer, mixing nozzles, a hydrocyclone, a vessel equipped with a mixing element (static or rotating), a rotor/stator mixer, a homogenizer, or an emulsifier. In some embodiments, the inline mixer is selected from the group consisting of a static mixer, a flow mixer, a line mixer, and a pipe mixer. In some embodiments, the mixing device is a static mixer. In some embodiments, the mixing device is installed directly downstream of the position at which the protic agent is added to the mother liquor. In some embodiments, the protic agent is added to the mother liquor at more than one position and a mixing device is installed downstream of each of the positions at which protic agent is added to the mother liquor.

In some embodiments, a heat exchanger operating as pre-heater is installed as a first element of the work-up section upstream of the evaporation unit, and the mixture of mother liquor and protic agent transferred into the work-up section is passed through this heat exchanger before entering the evaporation unit. In some embodiments, a pre-heater installed upstream of the evaporation unit allows the mother liquor to heat up to near evaporation conditions, thereby saving energy in the evaporation unit.

In some embodiments, the evaporation unit is a circulating evaporation unit including a heat exchanger and a separation vessel. In some embodiments, the circulating evaporation unit is operated by feeding the liquid phase to be evaporated into the heat exchanger, partly vaporizing the liquid phase in the heat exchanger, and returning the resulting liquid and vapor mixture to the separation vessel.

In some embodiments, adding a protic agent to the mother liquor to be worked up prevents or reduces fouling within the heat exchanger or heat exchangers to heat up the mother liquor. In some embodiments, the heat exchanger is the heat exchanger in a circulating evaporation unit or the heat exchanger being installed as pre-heater upstream of the evaporation unit. In some embodiments, the protic agent deactivates residues of catalyst and/or cocatalyst in the mother liquor.

In some embodiments, the evaporated part of the mother liquor withdrawn from the evaporation unit is subsequently condensed and transferred to a diluent distillation unit, thereby producing isolated diluent from the wax-depleted portion of the mother liquor. In some embodiments and in the diluent distillation unit, lower boiling point components of the mother liquor are separated from the diluent by a distillation step. In some embodiments, lower boiling point components are ethylene, hydrogen, those comonomers, which have a lower or a similar boiling point than the used diluent, and parts of the diluent. In some embodiments, n-hexane or a mixture of hexane isomers is used as diluent and 1-butene is used as comonomer, the greater part of the 1-butene in the mother liquor forms a part of the lower boiling point components separated from the diluent in the diluent distillation unit. In some embodiments, the greater part of the lower boiling point components of the mother liquor are recycled to the polymerizations in individual recycle circuits. In some embodiments, the greater part of the lower boiling point components of the mother liquor are recycled to the polymerizations in individual recycle circuits after having passed one or more further work-up steps. In some embodiments, higher boiling point components of the mother liquor are separated from the diluent by a distillation step. In some embodiments, the higher boiling point components are comonomers, having a boiling point similar to or higher than that of the used diluent. In some embodiments, the greater part of the higher boiling point components obtained by the distillation are recycled to the polymerizations. In some embodiments, the greater part of the higher boiling point components obtained by the distillation are recycled to the polymerizations after having passed one or more further work-up steps.

In some embodiments, the isolated diluent produced within the diluent distillation unit is at least partly recycled to the polymerization reactor or the series of polymerization reactors. In some embodiments, the isolated diluent is recycled to a polymerization reactor wherein an ethylene homopolymer is prepared. In some embodiments, the prepared ethylene polymer is a multimodal ethylene copolymer, the preparation of the ethylene polymer is carried out in a series of polymerization reactors, an ethylene homopolymer is prepared in one of the polymerization reactors, and the isolated diluent is recycled to the polymerization reactor wherein the ethylene homopolymer is prepared.

In some embodiments, from 5 to 70 wt. % of the mother liquor, which is recycled to the polymerization reactor or the series of polymerization reactors, are recycled as isolated diluent to the polymerization reactor or the series of polymerization reactors, alternatively from 7.5 to 60 wt. %, alternatively from 10 to 50 wt. %.

In some embodiments, the isolated diluent passes one or more purification steps, thereby obtaining a purified diluent, before being recycled to the polymerization reactor or the series of polymerization reactors. In some embodiments, the diluent purification steps are selected from the group consisting of a purification by adsorption, a purification by absorption, a catalytic hydrogenation, and a purification by a membrane purification process.

In some embodiments, the wax containing part of the mother liquor depleted in lower boiling point components, which is obtained in the evaporation unit, is transferred to a wax removal unit for removing wax from this part of the mother liquor. In some embodiments, wax withdrawn from the polymerization process in the wax removal unit is combusted for generating energy or sold as by-product of the polymerization process.

In some embodiments, the wax removal unit is operated by direct steam distillation, that is, by injecting steam directly into a vessel containing a hydrocarbon wax solution from which wax is removed. By injecting steam, a gaseous hydrocarbon/steam mixture, which is made from or containing primarily diluent and steam, is generated in the wax removal unit.

In some embodiments, acids or higher alcohols are used as protic agents, and those protic agents or their reaction products leave the process together with the wax or the wastewater.

In some embodiments, the gaseous hydrocarbon/steam mixture obtained in the wax removal unit is withdrawn from the wax removal unit, condensed, and transferred into a liquid-liquid separator, wherein the mixture is separated into an aqueous phase and a hydrocarbon phase. In some embodiments, the aqueous phase obtained in the liquid-liquid separator is discarded. In some embodiments, the hydrocarbon phase obtained in the liquid-liquid separator is recycled to a stage of the mother liquor work-up process upstream of the evaporation unit for producing the wax-depleted portion of the mother liquor. In some embodiments, the hydrocarbon phase obtained in the liquid-liquid separator is recycled to a stage of the mother liquor work-up process by adding to the mother liquor transferred into the work-up section.

FIG. 1 is a schematic of a process for preparing multimodal ethylene polymers in a series of three polymerization reactors by a suspension polymerization process using hexane as diluent.

For homopolymerizing ethylene or copolymerizing ethylene with other olefins in a first polymerization reactor (1) in suspension, recycled hexane is fed to the reactor (1) via feeding line (2). The other components of the reaction mixture like catalyst, ethylene and polymerization auxiliaries and optional components like possible comonomers and/or directly recycled mother liquor are fed to the reactor via one or more feeding lines (3).

As result of the polymerization in reactor (1), a suspension of solid ethylene polymer particles in a suspension medium is formed. This suspension is fed via line (4) to the second polymerization reactor (5) where further polymerization occurs. In some instances, fresh comonomer or further components of the reaction mixture are fed to reactor (5) via one or more feeding lines (6). In some instances, directly recycled mother liquor is fed to reactor (5) via line (23).

The suspension of reactor (5) is thereafter fed via line (7) to the third polymerization reactor (8) wherein additional polymerization is carried out. One or more feeding lines (9) allow supplementary feeding of comonomer or further components of the reaction mixture to reactor (8). Within polymerization reactor (8), further polymerization occurs. In some instances, directly recycled mother liquor is fed to reactor (8) via line (24).

The suspension of ethylene polymer particles in the suspension medium formed in reactor (8) is continuously transferred via line (10) to separator feed vessel (11). The suspension is then passed via line (12) to centrifuge (13), wherein the suspension is separated in solid ethylene polymer particles and mother liquor, that is, recovered liquid suspension medium. The isolated, wet ethylene polymer particles are discharged from centrifuge (13) via line (14).

The mother liquor obtained in centrifuge (13) is transferred via line (20) to a mother liquor collecting vessel (21). From there and in some instances, mother liquor is recycled by pump (22) via lines (23) and (24) to polymerization reactor (5) and/or polymerization reactor (8).

For work-up, mother liquor is branched-off line (23) and transferred via line (30) to mother liquor tank (31). From there, mother liquor is transferred by pump (32) via line (33) through heat exchanger (34) to an evaporation unit (35, 36). Evaporation unit (35, 36) is designed as a circulating evaporation unit operated by circulating the liquid phase to be evaporated through heat exchanger (36), wherein the liquid phase is partly vaporized. The heat exchanger (36) is connected to a separation vessel (35) wherein the entering liquid and vapor mixture is separated. Heat exchanger (34) acts as pre-heater wherein the mother liquor is heated up to near evaporation conditions, thereby saving energy in the evaporation unit (35, 36).

Line (37), which branches off line (30), allows feeding of mother liquor directly from mother liquor collecting vessel (21) to heat exchanger (34) and evaporation unit (35, 36) without passing through mother liquor tank (31). A protic agent is fed via line (38) into line (30) at a position upstream of the branch-off point of line (30). In some instances, the protic agent is added at a position upstream or downstream of mother liquor tank (31), or at a position upstream or downstream of pump (32), or into line (37).

The vaporized fractions of the mother liquor are withdrawn from the top of separation vessel (35) via line (50), condensed in heat exchanger (51) and transferred via line (52) into a distillation and purification unit (53), wherein purified hexane is generated from the vaporized fractions of the mother liquor. Purified hexane obtained in the distillation and purification unit (53) is transferred into a hexane tank (54) and, from there, recycled by pump (55) via line (2) as diluent to polymerization reactor (1).

A liquid phase enriched in higher boiling point fractions of the mother liquor is withdrawn from the bottom of separation vessel (35) via line (60) and transferred to a wax separation unit (61, 62, 63), which is operated by injecting steam via line (62) directly into a wax separator vessel (61). In some instances, liquid wax is withdrawn from the bottom of wax separator vessel (61) via line (63) and conveyed to an incineration unit (not shown) or to a solidifying unit or liquid shipping unit (not shown). In some instances, the incineration unit is used to generate steam.

In some instances, the set-up for preparing the multimodal ethylene polymers includes two wax separation units (61, 62, 63; with one depicted in FIG. 1) which are arranged in parallel and alternately supplied with the liquid phase coming from the bottom of the separation vessel (35). After switching the supply of the liquid phase coming from the bottom of the separation vessel (35) to the other, non-depicted wax separation unit, the liquid wax in wax separator vessel (61) is cooled down by feeding cold water into wax separator vessel (61). An agitator (not shown) within the wax separator vessel (61) prevents solidification of the liquid wax as a wax block. Instead, wax chunks are formed and discharged from wax separator vessel (61) via line (63) into bags or other containers (not shown).

The gaseous fractions obtained in wax separator vessel (61), which is made from or containing primarily hexane and water, are withdrawn from the top of wax separator vessel (61) via line (64), condensed in heat exchanger (65) and transferred into a liquid-liquid separation vessel (66). Water is withdrawn from the liquid-liquid separation vessel (66) via line (67) and transferred to a wastewater system (not shown). The hexane phase is withdrawn from the liquid-liquid separation vessel (66) via line (68) and transferred by pump (69) via line (70) to mother liquor tank (31).

Figure 2:
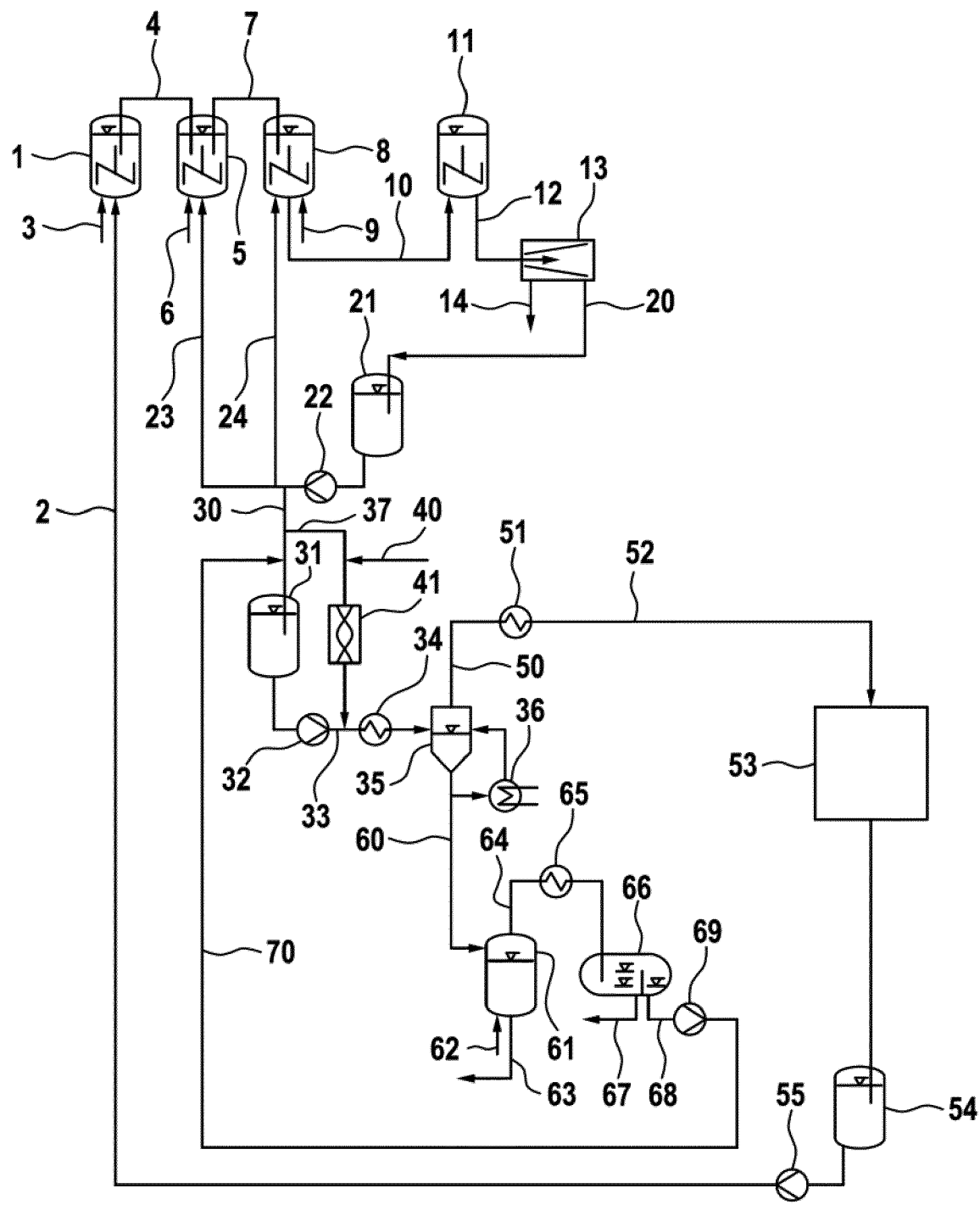
FIG. 2 is a schematic of a process for preparing ethylene polymers in suspension

FIG. 2 is a schematic of a process for preparing ethylene polymers in suspension.

The process shown in FIG. 2 is identical with the process in depicted FIG. 1, except that the protic agent is not added to line (30) but fed via line (40) to line (37) and a static mixer (41) is installed downstream of the position where the protic agent is introduced into line (37).

EXAMPLES

Comparative Example A

Polyethylene was continuously prepared in a commercially operated reactor system including three polymerization reactors as shown in FIG. 1, except that no protic agent was added via line (38). For a period of more than five years, polymerization of ethylene and optionally 1-butene as comonomer was carried out in the presence of Ziegler-type catalysts at reactor temperatures in the range from 65° C. to 85° C. and reactor pressures of from 0.2 MPa to 1.3 MPa, thereby preparing a variety of different polyethylene grades. Depending on the grades, the production rate varied in the range from 30 to 41 t/h. The amount of mother liquor withdrawn from centrifuge (13) and transferred via line (20) to mother liquor collecting vessel (21) was always in the range from 95 to 185 t/h. The mother liquor to be worked up was branched-off line (23) and passed through lines (30) and (37) to pre-heater (34). The amount of mother liquor which was worked up was in the range from 30 to 55 t/h. The amount of hexane phase withdrawn from liquid-liquid separation vessel (66) and transferred via line (70) to mother liquor tank (31) was in the range from 3 to 7 t/h.

During polymerization, the heat transfer in pre-heater (34) and in heat exchanger (36) declined to a large degree quickly. On average, the performance loss of pre-heater (34) was more than 50% in a period of 4 to 8 weeks. For heat exchanger (36), a performance loss of more than 30% occurred in a period of 10 to 26 weeks. The pre-heater (34) was cleaned at intervals of 6 to 12 weeks. The heat exchanger (36) was cleaned at intervals of three to six months, thereby maintaining heat transfer performance of the heat exchangers and mother liquor work-up capacity.

Example 1

The polymerization of Comparative Example A was repeated; however, line (37) was permanently closed and the whole amount of the mother liquor to be worked up was transferred via line (30) into mother liquor tank (31). Water was added as protic agent via line (38) as shown in FIG. 1 in an amount of 250 g water per ton of mother liquor which passed through line (30) into mother liquor tank (31).

During a period of five years, polymerizations of ethylene and optionally 1-butene as comonomer were carried out in the presence of Ziegler-type catalysts at reactor temperatures in the range from 65° C. to 85° C. and reactor pressures of from 0.2 MPa to 1.3 MPa, thereby preparing a variety of different polyethylene grades very similar to the polyethylene grades prepared in Comparative Example A.

Pre-heater (34) was operated without any cleaning for the whole five years. Heat exchanger (36) was cleaned once after 12 months during a regular maintenance shutdown as a preventive measure. There was no additional cleaning of heat exchanger (36) within the five years. Inspection of the mother liquor tank (31) after five years showed a sediment within mother liquor tank (31), thereby resulting in cleaning of mother liquor tank (31).

Example 2

The polymerization of Comparative Example A was repeated; however, water was added as protic agent via line

(40) as shown in FIG. 2 in an amount of 250 g water per ton of mother liquor which passed through line (37).

During a period of two years, polymerizations of ethylene and optionally 1-butene as comonomer were carried out in the presence of Ziegler-type catalysts at reactor temperatures in the range from 65° C. to 85° C. and reactor pressures of from 0.2 MPa to 1.3 MPa, thereby preparing a variety of different polyethylene grades very similar to the polyethylene grades prepared in Comparative Example A.

Pre-heater (34) was operated without any cleaning for the whole two years. Heat exchanger (36) was cleaned once after 12 months during a regular maintenance shutdown as a preventive measure. There was no additional cleaning of heat exchanger (36) within the two years. Inspection of the mother liquor tank (31) after two years showed that a sediment had not formed within mother liquor tank (31).

Example 3

The polymerization of Example 2 was repeated; however, LINEVOL 911, a mixture of n-nonanol, n-decanol, and n-undecanol (commercially available from Shell Chemicals), was added as protic agent via line (40) as shown in FIG. 2 in an amount of 750 g LINEVOL 911 per ton of mother liquor which passed through line (37).

During a period of two years, polymerizations of ethylene and optionally 1-butene as comonomer were carried out in the presence of Ziegler-type catalysts at reactor temperatures in the range from 65° C. to 85° C. and reactor pressures of from 0.2 MPa to 1.3 MPa, thereby preparing a variety of different polyethylene grades very similar to the polyethylene grades prepared in Example 2.

Pre-heater (34) was operated without any cleaning for the whole two years. Heat exchanger (36) was cleaned once after 12 months during a regular maintenance shutdown as a preventive measure. There was no additional cleaning of heat exchanger (36) within the two years. Inspection of the mother liquor tank (31) after two years showed that a sediment had not formed within mother liquor tank (31).

The invention claimed is:

1. A process for preparing an ethylene polymer in a suspension polymerization in a polymerization reactor or a series of polymerization reactors comprising the steps of:
    polymerizing ethylene or copolymerizing ethylene and one or more $C_3$-$C_{12}$-1-alkenes at temperatures of from 40 to 150° C. and pressures of from 0.1 to 20 MPa in the presence of a polymerization catalyst and forming a suspension of ethylene polymer particles in a suspension medium comprising a hydrocarbon diluent,
    transferring the suspension of ethylene polymer particles into a solid-liquid separator, wherein the suspension is separated into ethylene polymer particles and mother liquor,
    transferring a first part of the mother liquor into a work-up section comprising an evaporation unit for producing a wax-depleted portion of the mother liquor, wherein a protic agent is added to the part of the mother liquor which is transferred into the work-up section, and
    recycling a first part of the wax-depleted portion of the mother liquor to the polymerization reactor or the series of polymerization reactors.

2. The process of claim 1, wherein the protic agent is water, an alcohol, an acid, or a mixture thereof.

3. The process of claim 2, wherein the protic agent is water, and the water is added in liquid form, as steam or an aqueous solution of an organic or inorganic compound.

4. The process of claim 1, wherein the mixture of mother liquor and added protic agent to be transferred into the work-up section passes a mixing device before entering the work-up section.

5. The process of claim 4, wherein the mixing device is an inline mixer, a jet mixer, mixing nozzles, a hydrocyclone, a vessel equipped with a mixing element, a rotor/stator mixer, a homogenizer, or an emulsifier.

6. The process of claim 1, wherein a heat exchanger, operating as pre-heater, is installed upstream of the evaporation unit, and the mixture of mother liquor and added protic agent transferred into the work-up section is passed through the heat exchanger before entering the evaporation unit.

7. The process of claim 1, wherein the evaporation unit is a circulating evaporation unit comprising a heat exchanger and a separation vessel, and the circulating evaporation unit is operated by feeding the liquid phase to be evaporated into the heat exchanger, vaporizing partly the liquid phase in the heat exchanger, and returning the resulting liquid and vapor mixture to the separation vessel.

8. The process of claim 1, wherein the wax-depleted portion of the mother liquor produced in the evaporation unit is further subjected to a distillation process before being recycled to the polymerization reactor or the series of polymerization reactors.

9. The process of claim 1, wherein a wax containing part of the mother liquor depleted in lower boiling point components is withdrawn from the evaporation unit and transferred to a wax removal unit which is operated by direct steam distillation.

10. The process of claim 9, wherein the wax removal unit produces a gaseous hydrocarbon/steam mixture which is condensed and then separated, within a liquid-liquid separator, into an aqueous phase and a hydrocarbon phase, and the hydrocarbon phase is recycled to the evaporation unit.

11. The process of claim 1, wherein the prepared ethylene polymer is a multimodal ethylene copolymer.

12. The process of claim 11, wherein the preparation of the ethylene polymer is carried out in a series of polymerization reactors, and an ethylene homopolymer is prepared in one of the polymerization reactors.

13. The process of claim 12, wherein the ethylene homopolymer is prepared in the first polymerization reactor of the series of polymerization reactors, and a copolymer of ethylene is prepared in a subsequent polymerization reactor.

14. The process of claim 13, wherein the multimodal ethylene copolymer comprises from 35 to 65% by weight of ethylene homopolymer prepared in the first polymerization reactor and from 35 to 65% by weight of ethylene copolymer prepared in the subsequent polymerization reactor.

15. The process of claim 1, wherein the protic agent is added in a ratio of 10 g to 10000 g protic agent per ton of mother liquor.

16. The process of claim 1, wherein the protic agent is added at one or more positions to the mother liquor to be worked up between the evaporation unit and the point, where the part of the mother liquor to be worked-up is separated from the mother liquor which is recycled to the polymerization reactor or the series of polymerization reactors.

17. The process of claim 4, wherein the mixing device is installed directly downstream of the position at which the protic agent is added to the mother liquor.

18. The process of claim 1, wherein the prepared ethylene polymer has a density of from 0.90 g/cm$^3$ to 0.97 g/cm$^3$.

19. The process of claim 8, wherein the distillation process produces an isolated diluent from the wax-depleted portion of the mother liquor.

20. The process of claim 19, wherein the prepared ethylene polymer is a multimodal ethylene copolymer, the preparation of the ethylene polymer is carried out in a series of polymerization reactors, an ethylene homopolymer is prepared in one of the polymerization reactors, and the isolated diluent is recycled to the polymerization reactor wherein the ethylene homopolymer is prepared.

* * * * *